United States Patent Office.

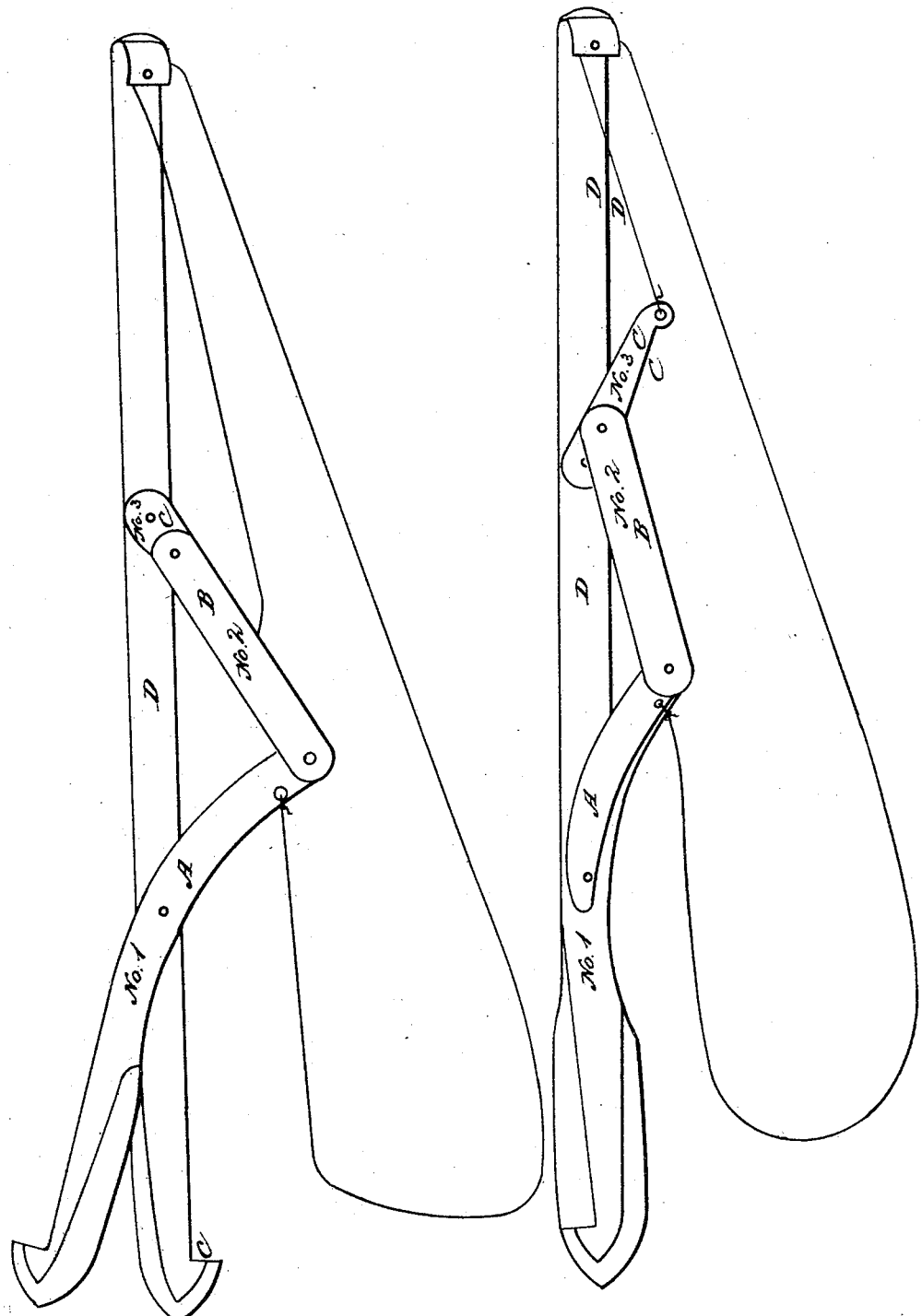

GEORGE W. HEATH, OF BURLINGTON, PENNSYLVANIA.

Letters Patent No. 63,634, dated April 9, 1867.

IMPROVEMENT IN HORSE HAY-FORKS.

*The Schedule referred to in these Letters Patent and making part of the same.*

TO ALL WHOM IT MAY CONCERN:

Be it known that I, GEORGE W. HEATH, of Burlington, in the county of Bradford, and State of Pennsylvania, have invented a new and useful Improvement in Horse Hay-Forks, or elevators and hay-knife combined; and I do hereby declare that the following is a full, clear, and exact description of the same, reference being had to the accompanying drawings, making part of the same, in which—

Figure 1 represents a fork and knife embracing my improvements, the fork being open or in position for elevating its load, or for use as a knife for cutting down through hay in the mow, &c.; and Figure 2 represents the same as closed, or in position for being inserted into the hay when it is to be used as an elevating fork.

My invention consists in a particular arrangement of the arms of the fork and the levers for operating the same, whereby I simplify the construction of the fork and knife, and am enabled to adjust the arms of the fork, as hereinafter explained.

Similar letters of reference refer to corresponding parts in both figures.

A represents the short bent arm of the fork, which is pivoted at a point at or near midway of its length to the long straight arm D. C is a lever, operated by means of a cord or rope (shown in red line in the drawing) passing through an eye or over a pulley at the upper end of the arm D. The lever C is pivoted to the arm D at a point about midway between the point of pivot of the two arms of the fork and the top of the long arm D, as shown in fig. 1. B is a link or connecting-rod, pivoted at one end to the lever C at any desired or convenient point in its length, and at its other end to the upper end of the short arm or blade A of the fork, as shown. The short arm A is provided at its upper end with a series of two or more perforations, for the purpose of affording a point of attachment of the link B and of the guiding cord or rope, as shown in the drawing; and these perforations may be used, if desired, for the adjustment of the link upon the short arm, thereby varying the throw or degree of opening of the arms of the fork. The arms or bars A and D are formed with cutting edges at their lower ends and points, said cutting edges being the outer edges when the fork is closed, as in fig. 2, the long arm D forming what I term the long-shear bar, and the bar A the short-shear bar.

The operation is as follows: The fork, being closed in position shown in fig. 2, is thrust down into the hay to the desired depth, when the lever is forced from its position in fig. 2 down into the position shown in fig. 1, thereby causing the arms of the fork to assume the position shown in said fig. 1, and throwing the projecting lips or shoulders formed on the lower ends of said arms out into and under the hay to be raised. The load is then elevated by any usual or ordinary means, and is guided by the cord or rope attached to the short arm until it reaches the desired position, when, by pulling upon the cord or rope attached to the lever C, the lever is raised to the position shown in fig. 2, closing the fork and discharging its load, and the fork is again in position for being inserted or thrust into the hay, repeating the operation as above. When desired, the fork, being provided with the cutting edges, as described, may be used as a hay-knife for cutting or chopping down the hay in the mow or stack. It will be seen that, by the construction above described, I dispense with all projecting points, which are found in many of the forks heretofore used, and which are liable, in raising, to interfere with the operation of the fork by striking under beams or other obstructions in its way.

Having now described the construction and operation of my improved hay-fork and knife, what I claim, is—

The arrangement of the adjustable link B, in combination with the short arm A, lever C, and bar D, in the manner and for the purpose shown and described.

I also claim providing the upper end of the short arm A of the fork with a series of two or more perforations, in the manner and for the purpose described.

G. W. HEATH.

Witnesses:
ALBERT LONG,
PHILANDER LONG.